US012639271B2

(12) United States Patent
Chen

(10) Patent No.: US 12,639,271 B2
(45) Date of Patent: May 26, 2026

(54) DATA STORAGE METHOD AND DEVICE FOR DATA STORAGE

(71) Applicant: SAMSUNG ELECTRONICS CO., LTD., Suwon-si (KR)

(72) Inventor: Zhonggang Chen, Xi'an hi tech Zone (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/143,789

(22) Filed: May 5, 2023

(65) Prior Publication Data

US 2024/0193131 A1 Jun. 13, 2024

(30) Foreign Application Priority Data

Dec. 8, 2022 (CN) .......................... 202211574879.1

(51) Int. Cl.
*G06F 16/18* (2019.01)
*G06F 16/906* (2019.01)

(52) U.S. Cl.
CPC ........ *G06F 16/1847* (2019.01); *G06F 16/906* (2019.01)

(58) Field of Classification Search
None
See application file for complete search history.

(56) References Cited

U.S. PATENT DOCUMENTS

| | | | |
|---|---|---|---|
| 6,643,654 B1 | 11/2003 | Patel et al. | |
| 7,975,061 B1 * | 7/2011 | Gokhale ............... | G06F 3/0665 709/239 |

| | | | |
|---|---|---|---|
| 9,459,806 B2 | 10/2016 | Berger et al. | |
| 10,509,770 B2 * | 12/2019 | Huo .................... | G06F 12/0246 |
| 10,761,750 B2 | 9/2020 | Dronamraju et al. | |
| 10,877,691 B2 | 12/2020 | Barczak et al. | |
| 10,929,066 B1 | 2/2021 | Dalmatov et al. | |
| 2013/0246726 A1 * | 9/2013 | Kirstenpfad ............ | G06F 16/10 711/170 |

(Continued)

FOREIGN PATENT DOCUMENTS

| | | |
|---|---|---|
| EP | 3 118 745 A1 | 1/2017 |
| EP | 3 985 496 A1 | 4/2022 |

(Continued)

OTHER PUBLICATIONS

Kim, Taejin, et al. "Fully automatic stream management for {Multi-Streamed}{SSDs} using program contexts." 17th USENIX Conference on File and Storage Technologies (FAST 19). 2019. (Year: 2019).*

(Continued)

*Primary Examiner* — Uyen T Le

(74) *Attorney, Agent, or Firm* — Sughrue Mion, PLLC

(57) ABSTRACT

A data storage method includes allocating first stream identifiers (IDs) of a first subset of streams of a storage device that supports multi-stream to data files based on first access attribute information of the data files, allocating second stream IDs of a second subset of the streams to metadata for the data files based on second access attribute information of the metadata, and writing the data files and the metadata into storage areas of the storage device based on the first stream IDs and the second stream IDs, respectively.

18 Claims, 9 Drawing Sheets

(56) References Cited

U.S. PATENT DOCUMENTS

| | | | |
|---|---|---|---|
| 2016/0283116 A1* | 9/2016 | Ramalingam | G06F 3/0629 |
| 2017/0075614 A1* | 3/2017 | Kanno | G06F 3/0679 |
| 2017/0228157 A1 | 8/2017 | Yang et al. | |
| 2017/0228188 A1* | 8/2017 | Hassani | G06F 3/0616 |
| 2018/0121090 A1* | 5/2018 | Choi | G06F 3/0616 |
| 2018/0307596 A1* | 10/2018 | Pandurangan | G06F 3/0652 |
| 2018/0307598 A1* | 10/2018 | Fischer | G06F 3/0679 |
| 2018/0373431 A1 | 12/2018 | Kathawala et al. | |
| 2020/0110537 A1 | 4/2020 | Hahn et al. | |
| 2020/0133668 A1* | 4/2020 | Chen | G06F 16/273 |
| 2021/0034536 A1* | 2/2021 | Kim | G06F 13/1673 |
| 2021/0064290 A1 | 3/2021 | Kanno | |
| 2021/0064543 A1* | 3/2021 | Yang | G06F 12/0253 |
| 2021/0109856 A1* | 4/2021 | Lee | G06F 11/3037 |
| 2021/0303153 A1 | 9/2021 | Lv et al. | |
| 2021/0326067 A1* | 10/2021 | Li | G06F 3/0679 |
| 2022/0342542 A1 | 10/2022 | Alkalay et al. | |
| 2022/0405000 A1* | 12/2022 | Hong | G06F 3/0652 |

FOREIGN PATENT DOCUMENTS

| | | | | |
|---|---|---|---|---|
| EP | 4202631 A1 * | 6/2023 | ......... | G06F 3/0614 |
| KR | 20220125895 A * | 9/2022 | ......... | G06F 3/0679 |
| WO | 2012/170751 A2 | 12/2012 | | |

OTHER PUBLICATIONS

Ou, Jiaxin, and Jiwu Shu. "Fast and failure-consistent updates of application data in non-volatile main memory file system." 2016 32nd Symposium on Mass Storage Systems and Technologies (MSST). IEEE, 2016 (Year: 2016).*

Chun, Yongjae, Kyeore Han, and Youpyo Hong. "High-performance multi-stream management for SSDs." Electronics 10.4 (2021): 486. (Year: 2021).*

Yang et al., "AutoStream: Automatic Stream Management for Multi-stream SSDs," Proceedings of the 10th ACM International System and Storage Conference (SYSTOR '17), May 2017, Total 14 pages.

Rho et al., "FStream: Managing Flash Streams in the File System," Proceedings of the 16th USENIX Conference on File and Storage Technologies, Feb. 2018, Total 8 pages.

Kim et al., "PCStream: Automatic Stream Allocation Using Program Contexts," Proceedings of the 10th USENIX Conference on Hot Topics in Storage and File Systems (HotStorage '18), Jul. 2018, Total 7 pages.

European Extended Search Report issued Apr. 23, 2024 by the European Patent Office for EP Patent Application No. 23208698.3.

* cited by examiner

FIG. 3

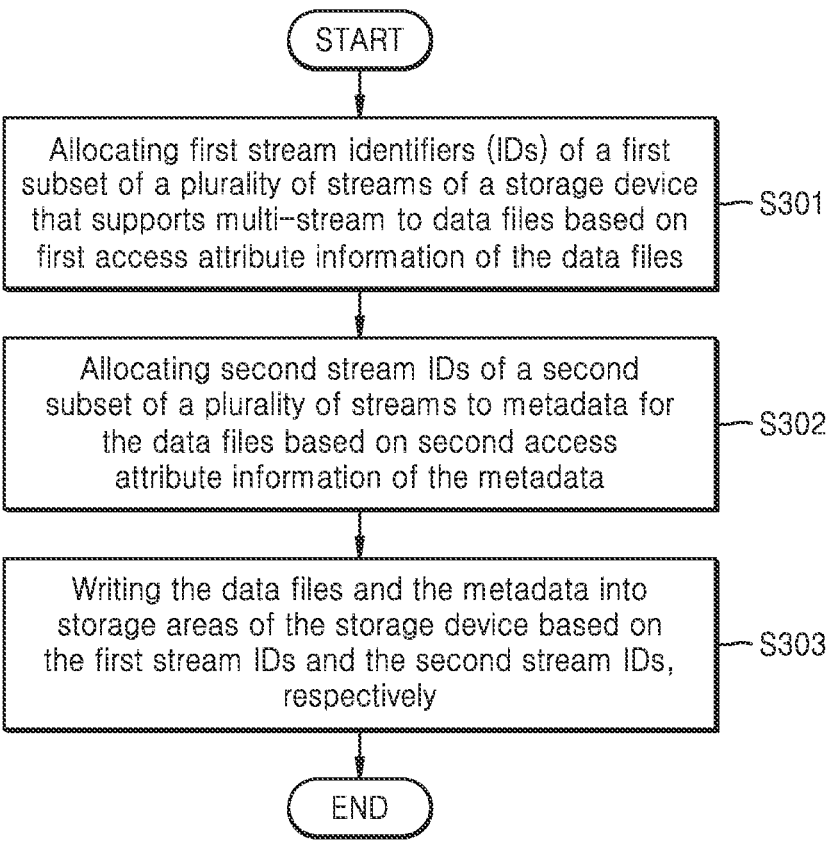

START

Allocating first stream identifiers (IDs) of a first
subset of a plurality of streams of a storage device
that supports multi-stream to data files based on
first access attribute information of the data files — S301

Allocating second stream IDs of a second
subset of a plurality of streams to metadata for
the data files based on second access
attribute information of the metadata — S302

Writing the data files and the metadata into
storage areas of the storage device based on
the first stream IDs and the second stream IDs,
respectively — S303

END

DATA STORAGE METHOD AND DEVICE FOR DATA STORAGE

CROSS-REFERENCE TO RELATED APPLICATION

This application is based on and claims priority under 35 U.S.C. § 119 to Chinese Patent Application No. 202211574879.1, filed on Dec. 8, 2022, in the Chinese Intellectual Property Office, the disclosure of which is incorporated by reference herein in its entirety.

BACKGROUND

The present disclosure generally relates to the technical field of data storage, and more particularly, to a data storage method and device for data storage.

A Multi-Stream storage mechanism writes data with a same update frequency into a same block of a storage device based on a special write characteristic for flash memory devices (e.g., a solid-state drive (SSD), a Universal Flash Storage (UFS), an embedded Multi Media Card (eMMC) supporting Multi-stream, etc.). This mechanism may reduce or eliminate Garbage Collection (GC) by reducing moving operations for valid data and reducing write amplification.

However, an allocation mechanism used in the multi-storage will directly affect a GC effect of the storage device.

SUMMARY

It is an aspect to provide a data storage method and device for data storage, which can more accurately allocate a same block of the storage device to data that actually have a same or similar update frequency, thereby reducing data moving operations during GC and extending a service life of the storage device.

According to an aspect of one or more embodiments, there is provided a data storage method comprising allocating first stream identifiers (IDs) of a first subset of a plurality of streams of a storage device that supports multi-stream to data files based on first access attribute information of the data files; allocating second stream IDs of a second subset of the plurality of streams to metadata for the data files based on second access attribute information of the metadata; and writing the data files and the metadata into storage areas of the storage device based on the first stream IDs and the second stream IDs, respectively.

According to another aspect of one or more embodiments, there is provided a data storage device comprising at least one processor that is configured to at least allocate first stream identifiers (IDs) of a first subset of a plurality of streams of a storage device that supports multi-stream to data files based on first access attribute information of the data files, and to allocate second stream IDs of a second subset of the plurality of streams to metadata for the data files based on second access attribute information of the metadata; and write the data files and the metadata into storage areas of the storage device based on the first stream IDs and the second stream IDs, respectively.

According to yet another aspect of one or more embodiments, there is provided a non-transitory computer-readable storage medium that stores a computer program which, when executed by a processor, causes the processor to at least allocate first stream identifiers (IDs) of a first subset of a plurality of streams of a storage device that supports multi-stream to data files based on first access attribute information of the data files; allocate second stream IDs of a second subset of the plurality of streams to metadata for the data files based on second access attribute information of the metadata; and write the data files and the metadata into storage areas of the storage device based on the first stream IDs and the second stream IDs, respectively.

BRIEF DESCRIPTION OF DRAWINGS

The above and other aspects, features, and advantages of certain embodiments of the present disclosure will be more apparent from the following description taken in conjunction with the accompanying drawings, in which:

FIG. 3 is a flowchart illustrating a data storage method according to some embodiments;

FIG. 6 is a block diagram of a host storage system according to some embodiments;

FIG. 7 is a diagram of a UFS system according to some embodiments;

DETAILED DESCRIPTION

Figure 1:
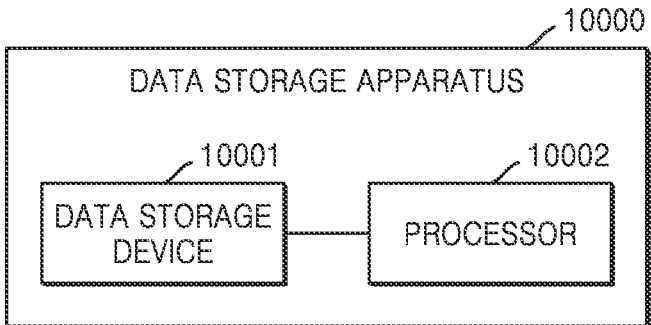
FIG. 1 is a block diagram illustrating an example of a data storage apparatus according to some embodiments.

A Multi-Stream storage mechanism writes data with a same update frequency into a same block of a storage device based on a special write characteristic for flash memory devices (e.g., a solid-state drive (SSD), a Universal Flash Storage (UFS), an embedded Multi Media Card (eMMC) supporting Multi-stream, etc.), so as to reduce moving operations for valid data and reduce write amplification during Garbage Collection (GC).

The multi-stream mechanism maps data with different update frequencies to different streams, and uses stream identifiers (IDs) to represent the different streams.

An allocation mechanism of the stream IDs directly affects a GC effect of the storage device, and the multi-stream mechanism may bring significant improvement in performance when all the data belonging to the same stream have the same or similar update frequency.

Therefore, it is an urgent problem to be solved regarding how to allocate an accurate stream ID to data based on the multi-stream mechanism to ensure that update frequencies of data corresponding to the same stream ID are closer, so as to improve GC performance.

Various embodiments provide a data storage method and device for data storage, which can more accurately allocate a same block of the storage device to data that actually have a same or similar update frequency, thereby reducing data moving operations during GC and extending a service life of the storage device.

According to some embodiments, a data storage method, wherein data is stored in a storage device supporting Multi-stream, includes allocating stream identifiers (IDs) of a first subset of a plurality of streams of the storage device to user's data files based on access attribute information of the data files; allocating stream IDs of a second subset of the plurality of streams to metadata for the data files based on access attribute information of the metadata; and writing the data files and the metadata into storage areas of the storage device indicated by the corresponding allocated stream IDs respectively.

Application developers and kernel developers may have different understandings for a data update frequency, for example, actual update frequencies of a data file and metadata that nominally have the same update frequency may be quite different. The data file and the metadata may be assigned the same stream ID due to nominally having the same update frequency, which may degrade the GC performance of the storage device. According to the data storage method of some embodiments, by allocating different subsets of the plurality of streams to the data files and metadata, different stream IDs may be allocated to the data files and the metadata that nominally have the same update frequency but actually have different update frequencies.

In some embodiments, the access attribute information of the data files may include at least one of creation information, open information, modification information, close information and deletion information; and wherein the access attribute information of the metadata may include sequentiality, frequency, and recency.

In some embodiments, the allocating the stream IDs of the first subset of the plurality of streams of the storage device to the user's data files based on the access attribute information of the data files may include clustering the access attribute information of the data files, and determining the stream IDs of the first subset corresponding to the data files based on a result of the clustering; or determining a similarity between the data files based on the access attribute information of the data files, and determining the stream IDs of the first subset corresponding to the data files based on the similarity.

According to this configuration, based on the similarity between the data files or clustering categories corresponding to the data files, data files with the same or similar access frequency may be stored in the same block of the storage device, thereby improving GC performance of the storage device.

In some embodiments, the allocating the stream IDs of the second subset of the plurality of streams to the metadata for the data files based on the access attribute information may include clustering the access attribute information of the metadata, and determining the stream IDs of the second subset corresponding to the data files based on a result of the clustering; or determining a similarity between the metadata based on the access attribute information of the metadata, and determining the stream IDs of the second subset corresponding to the metadata based on the similarity.

According to this configuration, based on the similarity between the metadata or clustering categories corresponding to the metadata, metadata with the same or similar access frequency may be stored in the same block of the storage device, thereby improving GC performance of the storage device.

In some embodiments, the method may further include storing the access attribute information of the data files in a file attribute table; and storing the access attribute information of the metadata in a metadata access table.

According to some embodiments, a device for data storage, wherein the data is stored in a storage device supporting Multi-stream, may include allocating logic configured to allocate stream identifiers (IDs) of a first subset of a plurality of streams of the storage device to user's data files based on access attribute information of the data files, and allocate stream IDs of a second subset of the plurality of streams to metadata for the data files based on access attribute information of the metadata; and writing logic configured to write the data files and the metadata into storage areas of the storage device indicated by the corresponding allocated stream IDs respectively.

Application developers and kernel developers may have different understandings for a data update frequency, for example, actual update frequencies of a data file and metadata that nominally have the same update frequency may be quite different. The data file and the metadata may be assigned the same stream ID due to nominally having the same update frequency, which may degrade the GC performance of the storage device. According to the device implementing the data storage method of some embodiments, by allocating different subsets of the plurality of streams to the data files and metadata, different stream IDs may be allocated to the data files and the metadata that nominally have the same update frequency but actually have different update frequencies.

In some embodiments, the access attribute information of the data files may include at least one of creation information, open information, modification information, close information and deletion information; and wherein the access attribute information of the metadata may include sequentiality, frequency, and recency.

In some embodiments, the allocating logic may be configured to cluster the access attribute information of the data files, and determine the stream IDs of the first subset corresponding to the data files based on a result of the clustering, or determine a similarity between the data files based on the access attribute information of the data files, and determine the stream IDs of the first subset corresponding to the data files based on the similarity.

According to this configuration, based on the similarity between the data files or clustering categories corresponding to the data files, data files with the same or similar access frequency may be stored in the same block of the storage device, thereby improving GC performance of the storage device.

In some embodiments, the allocating logic may be configured to cluster the access attribute information of the metadata, and determine the stream IDs of the second subset corresponding to the data files based on a result of the clustering, or determine a similarity between the metadata based on the access attribute information of the metadata, and determine the stream IDs of the second subset corresponding to the metadata based on the similarity.

According to this configuration, based on the similarity between the metadata or clustering categories corresponding to the metadata, metadata with the same or similar access frequency may be stored in the same block of the storage device, thereby improving GC performance of the storage device.

In some embodiments, the device for data storage may further include a storage configured to store the access attribute information of the data files in a file attribute table, and store the access attribute information of the metadata in a metadata access table.

According to some embodiments, a system to which a storage device is applied, may include a main processor, a memory, and a storage device, wherein the memory stores a computer program for the main processor to execute the data storage method as described above.

According to some embodiments, a host storage system may include a host and a storage device, wherein the host is configured to perform the data storage method as described above.

According to some embodiments, a Universal Flash Storage (UFS) system may include a UFS host, a UFS device, and a UFS interface used for a communication between the UFS host and the UFS device, wherein the UFS host is configured to perform the data storage method as described above.

According to some embodiments, a data center system may include a plurality of application servers, and a plurality of storage servers, wherein each storage server comprises a storage device, wherein at least one of the plurality of application servers and the plurality of storage servers is configured to perform the data storage method as described above.

According to some embodiments, a computer-readable storage medium may store a computer program which, when executed by a processor, implementing the data storage method as described above.

According to some embodiments, an electronic device may include a processor, and a memory storing a computer program which, when executed by the processor, implementing the data storage method as described above.

Hereinafter, various embodiments are described with reference to the accompanying drawings, in which like reference numerals are used to depict the same or similar elements, features, and structures. However, the present disclosure is not intended to be limited by the various embodiments described herein to a specific embodiment and it is intended that the present disclosure covers all modifications, equivalents, and/or alternatives of the present disclosure, provided they come within the scope of the appended claims and their equivalents. The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms include plural forms, unless the context clearly dictates otherwise. The terms "include," "comprise," and "have", used herein, indicate disclosed functions, operations, or the existence of elements, but do not exclude other functions, operations, or elements.

As used in this specification, the expressions "A or B," or "at least one of A and/or B" may indicate A and B, A, or B. For instance, the expression "A or B" or "at least one of A and/or B" may indicate (1) A, (2) B, or (3) both A and B.

In various embodiments, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing various embodiments of the present disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a processor (for example, a central processing unit (CPU) or an application processor (AP)) for performing corresponding operations by executing at least one software program stored in a memory device.

The terms used herein are to describe certain embodiments, but are not intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding embodiments of the present disclosure.

FIG. 1 is a block diagram illustrating an example of a data storage device 10000 according to some embodiments.

Referring to FIG. 1, a data storage apparatus 10000 may include a data storage device 10001 and a processor 10002. Although not shown in FIG. 1, the data storage apparatus 10000 may be connected to an external memory and/or communicate with an external device. The data storage apparatus 10000 shown in FIG. 1 may include components associated with the current example. Accordingly, it will be apparent to those of ordinary skill in the art that components other than those shown in FIG. 1 may also be included in the data storage apparatus 10000.

The data storage device 10001 may be any type of storage device that supports a Multi-streaming mechanism.

The processor 10002 may control data storage operations of the data storage apparatus 10000.

Figure 2:
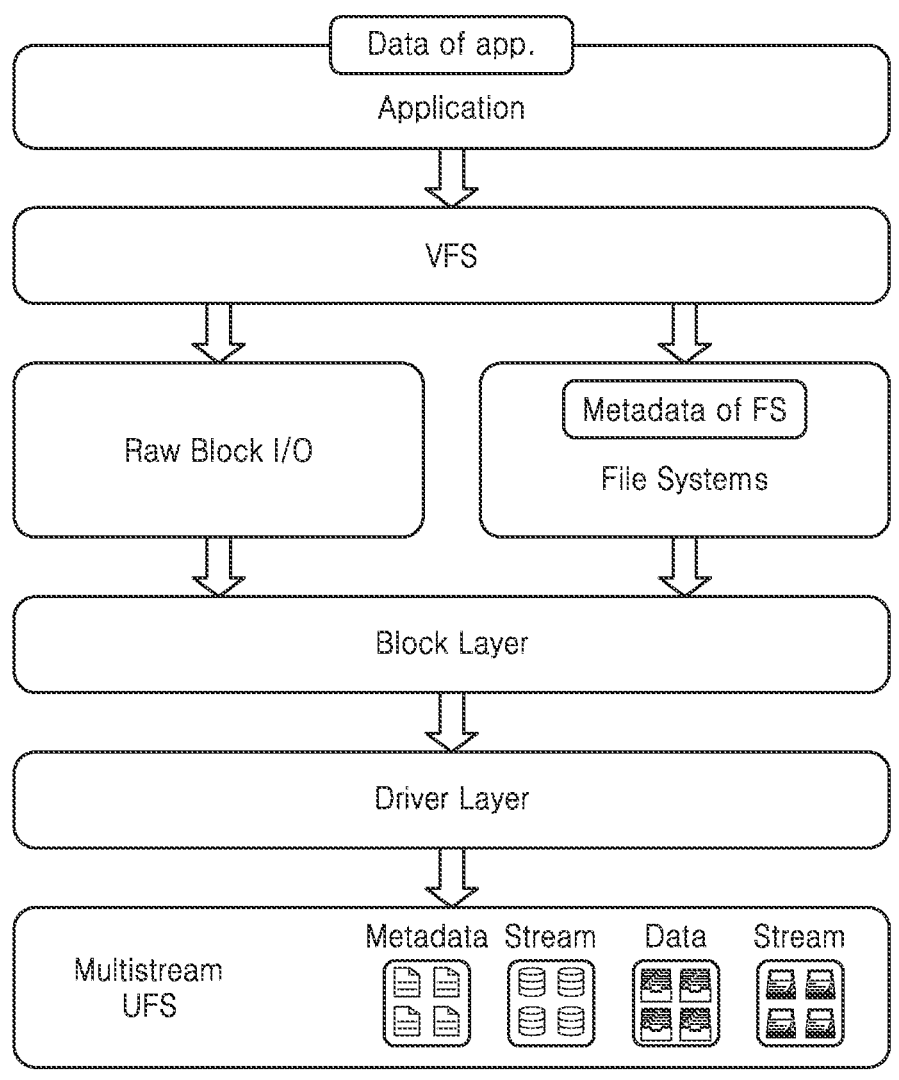
FIG. 2 is a flowchart illustrating a data storage method for a Universal Flash Storage (UFS), according to some embodiments.

FIG. 2 is a flowchart illustrating a data storage method for a Universal Flash Storage (UFS), according to some embodiments.

Referring to FIG. 2, data files generated by an application (for example, an Android application, such as a WeChat application, etc.) are sent to a virtual file system (VFS). Then, the data files are sent to a multi-stream UFS device via a raw block, a block layer and a driver layer. Metadata for the data files is generated based on data files by a file system (FS), and are sent to the multi-stream UFS device via the block layer and the driver layer, wherein the data files and/or the metadata sent to the UFS device may have corresponding stream IDs. The UFS device may store the data files and/or the metadata mapped to the stream IDs in blocks corresponding to the stream IDs based on the stream IDs, wherein the stream ID indicates a stream corresponding to the ID.

Since the UFS device itself has very little information, it cannot understand an update frequency of data. Therefore, only the producer of the data, that is, the upper-layer software including a user program and an operating system understands the update frequency of the data. Therefore, the upper-layer software is responsible for mapping data to be written with stream IDs, and the UFS device is only responsible for writing the data corresponding to the stream IDs into blocks corresponding to the stream IDs. For example, the upper-layer software may generate or otherwise provide stream IDs for the data in order to indicate to the UFS device how the data should be written.

In the related art, a mapping relationship between data files and stream IDs is usually predetermined by the developer of the application program, and the mapping between metadata and stream IDs is randomly determined.

However, because application developers and kernel developers may have different understandings for/of data update frequency, a data file and metadata that nominally have a same update frequency (e.g., the update frequency of the data file and metadata is indicated by a short write hint) may actually have different update frequencies. In this case, storing the data file and the metadata that actually have different update frequencies into the same block reduces GC performance of the UFS device.

The data storage method and the device for data storage according to some embodiments isolate stream IDs of data files and stream IDs of metadata, thereby avoiding storing a data file and metadata that actually having different update frequencies in the same block. That is, the data storage method and device for data storage according to some embodiments separates stream IDs of data files from stream Ids of metadata so that the stream IDs for each may be handled separately.

Those skilled in the art will understand that the UFS in FIG. 1 is described by way of example and the technical concept may be applied to other types of storage devices (e.g., an SSD or an eMMC).

FIG. 3 is a flowchart illustrating a data storage method according to some embodiments.

Referring to FIG. 3, in step S301, stream identifiers (IDs) of a first subset of a plurality of streams of the storage device are allocated to data files based on access attribute information of the data files. In some embodiments, the data files may be data files of a user. For example, the data files may be data files of an application being used by a user.

In step S302, stream IDs of a second subset of the plurality of streams are allocated to metadata for the data files based on access attribute information of the metadata.

Those skilled in the art will understand that, in various embodiments, step S301 and step 302 may be performed simultaneously, sequentially or in reverse order.

For example, if the storage device supports 10 streams, and IDs of the 10 streams are ID_1 to ID_10, the stream IDs of the first subset that is allocated to the data files may be ID_1 to ID_5, and the stream IDs of the second subset that is allocated to the metadata of the data files may be ID_6 to ID_10.

In some embodiments, the first subset does not intersect with the second subset to avoid allocating the same stream ID to the data files and the metadata. In some embodiments, a portion of the first subset may not intersect with the second subset and another portion of the first subset may intersect with the second subset. For example, in some embodiments, one data file and one metadata may be allocated the same stream ID, while the remaining data files are allocated stream IDs which do not intersect with stream IDs of the metadata for the data files.

In some embodiments, the access attribute information of the data files may include at least one of creation information, open information, modification information, close information or deletion information. In some embodiments, the access attribute information of the metadata may include sequentiality, frequency, and/or recency.

As an example, the access attribute information of the data files may be collected through a file event monitor.

Specifically, each data file may correspond to an index node (inode), and the index node stores at least one of the following information related to the data file: the number of bytes of the file, a User ID of an owner of the file, a Group ID of the file, executing permissions for reading and writing for the file, a file timestamp (ctime which refers to the last change time of the inode, mtime which refers to the last change time of content of the file, and atime which refers to the last time the file was opened) and a location of a block corresponding to the data file.

As an example, the file event monitor may periodically use a monitoring tool (e.g., an inotify tool that comes with a linux kernel) for the inodes to, for example, monitor all opened files and obtain various file attributes (e.g., file path, type, opening time, the number of modifications, etc.).

As an example, the file event monitor may continuously monitor creation, open, modification, close, and/or deletion for files (e.g., file information may be obtained from the inodes using a tool (e.g., perfetto) provided by Android or other methods). The file event monitor may capture a file when the file is opened, and record file information (the own attributes of the inode or file-based events) in a file attribute table. The file event monitor may also continuously monitor these opened files to update their attributes.

As an example, file-based events may include:

```
IN_ACCESS /* a file is accessed */
IN_MODIFY /* a file is modified */
IN_ATTRIB /* metadata is changed */
IN_CLOSE_WRITE /* a writable file is closed */
IN_CLOSE_NOWRITE /* an unwritable file are closed */
IN_OPEN /* a file is opened */
IN_MOVED_FROM /* a file is moved from X */
IN_MOVED_TO /* a file is moved to Y */
IN_CREATE /* a subfile is created */
IN_DELETE /* a subfile is deleted */
IN_DELETE_SELF /* Self deleting */
IN_MOVE_SELF /* Self moving */.
```

As an example, since the attribute information of a data file may change, the attribute information of the data file acquired by the file event monitor may be dynamically updated.

As an example, the allocating the stream IDs of the first subset of the plurality of streams of the storage device to the data files based on the access attribute information of the data files may include clustering the access attribute information of the data files, and determining the stream IDs of the first subset corresponding to the data files based on a result of the clustering; or determining a similarity between the data files based on the access attribute information of the data files, and determining the stream IDs of the first subset corresponding to the data files based on the similarity.

As an example, clustering may be performed on attribute information of data files, and the same stream ID may be allocated to data files whose attribute information belongs to the same category according to a result of the clustering.

As an example, clustering (for example, the kmeans algorithm may be used) may be performed on the access attribute information of data files (e.g., the number of times a file is opened, the number of times the file is closed, the number of times of input/output (IO) for write of the file, modification probability estimate $e^{(-S\_file)}$ based on a file size (S_file represents the size of the file)), and data files whose access attribute information belongs to the same category after clustering may be determined as having the same access mode, and then the same stream ID may be allocated to the data files with the same access mode.

Those skilled in the art will understand that different types of access attribute information (i.e., different subsets of access attributes) may be selected to determine access modes of the data files based on a clustering algorithm.

For example, in some embodiments, if the attribute information of a first data file, a second data file and a third data file have the same clustering category, the same stream ID may be allocated to the first data file, the second data file and the third data file.

For example, in some embodiments, if clustering categories of the attribute information of the first data file, the second data file and the third data file are different, different stream IDs of the first subset are allocated to the first data file, the second data file and the third data file. For example, ID_1, ID_2, and ID_3 may be allocated to the first data file, the second data file, and the third data file, respectively.

As an example, in some embodiments, a similarity between data files may be calculated by a file pattern similarity analyzer. Specifically, the analyzer may maintain a data file attribute table, which stores attribute information of all monitored data files. Since there is a one-to-one correspondence between inode IDs and files, the analyzer uses inode IDs as IDs of the files in the attribute table.

As an example, in some embodiments, the similarity between the data files may be calculated by a similarity algorithm (e.g., Pearson correlation coefficient) based on the access attribute information of the data files.

As an example, in some embodiments, data files with a similarity greater than a threshold may be determined to have the same access mode, and the same stream ID may be allocated to the data files with the same access mode. The threshold may be preset, set dynamically, or set experimentally.

Specifically, the information of each index node (that is, at least one attribute information of each file) may be regarded as a vector, and whether the data files have the same access mode may be determined by measuring a similarity between vectors.

Those skilled in the art will understand that measuring the similarity between vectors indicates performing tasks such as calculating a distance between vectors. The distance in metric space may be a Euclidean distance, a Manhattan distance and a Chebyshev distance. These are all distances that may be applied to numeric vectors.

As an example, read heat of files may be taken as an analysis target, and at least one of the following items may be regarded as an attribute vector: open information, access information, modification information, close information, deletion information, file size, modification probability estimation based on the file size, and whether files have the same access mode are determine by calculating the distance between the attribute vectors for the files.

Cosine similarity is a similarity measure of two vectors in the inner product space, which is used to measure the cosine value of the angle between the two vectors. Cosine of 0° equals 1, and cosine of any other angle is less than 1.

As an example, the similarity between files may be calculated by the following equation:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}}$$

Wherein, $\theta$ represents the angle between A and B, A and B represent the access attribute vectors of one data file and another data file respectively, $A_i$ represents a value of the ith access attribute of the one data file, and $B_i$ represents a value of the ith access attribute of the another data file.

As an example, when the similarity between the two data files is greater than a preset threshold, the one data file and the another data file are determined to have the same access mode (i.e., the same read heat). Therefore, the same ID of the first subset are allocated to the one data file and the another data file.

Those skilled in the art will understand that a subset of attributes closely related to the read heat of the file may be selected for calculating the similarity, so as to reflect the access pattern as much as possible.

As an example, the allocating the stream IDs of the second subset of the plurality of streams to the metadata for the data files based on the access attribute information may include clustering the access attribute information of the metadata, and determining the stream IDs of the second subset corresponding to the data files based on a result of the clustering; or determining a similarity between the metadata based on the access attribute information of the metadata, and determining the stream IDs of the second subset corresponding to the metadata based on the similarity.

As an example, clustering (for example, the kmeans algorithm may be selected) may be performed on the access attribute information of the metadata (information such as sequentiality, frequency and/or recency (SFR) etc.), and determining the metadata whose access attribute information belongs to the same category after clustering as having the same access mode, and then allocating the same stream ID to the metadata with the same access mode.

As an example, in some embodiments, if the attribute information of a first metadata, a second metadata and a third metadata have the same clustering category, the same stream ID are allocated to the first metadata, the second metadata and the third metadata.

For example, in some embodiments, if clustering categories of the attribute information of the first metadata, the second metadata and the third metadata are different, different stream IDs of the second subset are allocated to the first metadata, the second metadata and the third metadata. For example, ID_6, ID_7, and ID_8 may be allocated to the first metadata, the second metadata, and the third metadata, respectively.

Allocating the stream IDs of the first subset to the data files based on similarity calculation is described in detail above. Similar approaches may be used to allocate the stream IDs of the second subset to the metadata when performing similarity calculations for the metadata.

As an example, the data storage method may further include storing the access attribute information of the data files in a file attribute table; and storing the access attribute information of the metadata in a metadata access table.

The access attribute information of the data files is stored, and the file attribute table is used to perform clustering or a similarity calculation to determine the stream IDs for the data files.

The metadata access table is used to store the access attribute information of the metadata to perform clustering or similarity calculation to determine the stream IDs for the metadata.

Referring back to FIG. 3, in Step S303, the data files and the metadata are written into storage areas of the storage device indicated by the corresponding allocated stream IDs respectively.

For example, if a stream ID_1 of a first subset is allocated to the first data file, the first data file will be stored in a block corresponding to stream ID_1 of the storage device, and if a stream ID_6 of the second subset is allocated to the first metadata, the first metadata is stored in a block corresponding to stream ID_6 of the storage device.

As an example, in some embodiments, a stream ID mapped to a data file may be embedded in the data file, and the file data into which stream ID is embedded may be transmitted to the storage device. In some embodiments, a stream ID mapped with the metadata may be embedded in the metadata, and the metadata into which the stream ID is embedded may be transmitted to the storage device.

As an example, the storage device may, upon receiving the data file or the metadata into which a stream ID is embedded, extract the stream ID from the data file or the metadata, and store the data file or the metadata into which the stream ID is embedded in a block corresponding to the stream ID of the storage device based on the embedded stream ID.

As an example, the clustering or similarity calculation for the metadata may be performed when the file system is not busy.

As an example, in order to notify the application layer of the number of streams used for splitting hot and cold data in the current file system, the method may further include recording the number of streams in the second subset in a preset directory of the file system (for example, proc file system).

Those skilled in the art will understand that if the storage device supports at most M streams, when the file system occupies K streams, the application layer occupies at most M-K streams.

As an example, in some embodiments, the data file and a stream ID of the first subset corresponding to the data file, and the metadata and a stream ID of the second subset corresponding to the metadata may be packaged and encapsulated respectively, and sent to the storage device, so that the storage device may perform physical-isolated storage for the data file and the metadata according to the stream IDs.

According to some embodiments, since data with different update frequencies are stored on physical-isolated physical blocks, when GC occurs, generated data movement operations will be reduced, and thus the write amplification will also be reduced. Therefore, the service life of the storage device is maximized.

The data storage method according to some embodiments has been described above with reference to FIGS. 2-3. A device for data storage, a data storage system, and a data storage apparatus according to some embodiments will be described below with reference to FIGS. 4-9.

Figure 4:
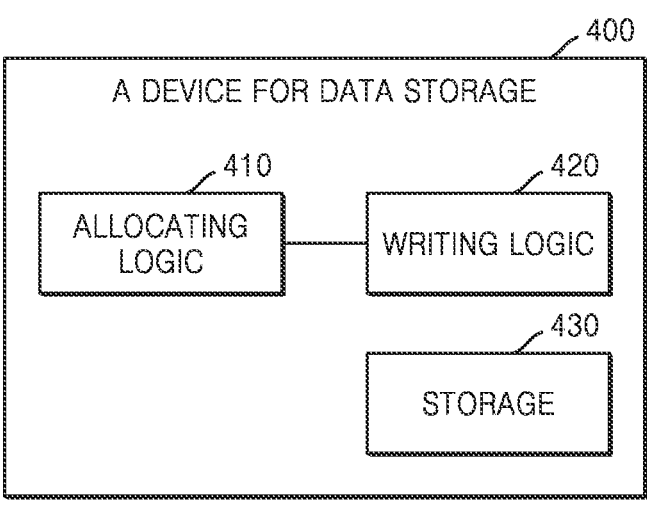
FIG. 4 illustrates a block diagram of a device for data storage, according to some embodiments.

FIG. 4 shows a block diagram of a device for data storage 400 according to some embodiments.

Referring to FIG. 4, the device for data storage 400 may include allocating logic 410 and a writing logic 420. Those skilled in the art will understand that the device for data storage 400 may additionally include other components, and at least one component of the device for data storage 400 may be divided or combined.

As an example, the allocating logic 410 may be configured to allocate stream identifiers (IDs) of a first subset of a plurality of streams of the storage device to user's data files based on access attribute information of the data files, and allocate stream IDs of a second subset of the plurality of streams to metadata for the data files based on access attribute information of the metadata.

As an example, the writing logic 420 may be configured to write the data files and the metadata into storage areas of the storage device indicated by the corresponding allocated stream IDs respectively.

As an example, the access attribute information of the data files may include at least one of creation information, open information, modification information, close information and deletion information; and wherein the access attribute information of the metadata may include sequentiality, frequency, and/or recency.

As an example, the allocating logic 410 may be configured to cluster the access attribute information of the data files, and determine the stream IDs of the first subset corresponding to the data files based on a result of the clustering; or determine a similarity between the data files based on the access attribute information of the data files, and determine the stream IDs of the first subset corresponding to the data files based on the similarity.

As an example, the allocating logic 410 may be configured to cluster the access attribute information of the metadata, and determine the stream IDs of the second subset corresponding to the data files based on a result of the clustering; or determine a similarity between the metadata based on the access attribute information of the metadata, and determine the stream IDs of the second subset corresponding to the metadata based on the similarity.

As an example, the device for data storage 400 may further comprising a storage 430 configured to store the access attribute information of the data files in a file attribute table, and to store the access attribute information of the metadata in a metadata access table.

As an example, the device for data storage 400 may further include recording logic (not shown) configured to record the number of streams in the second subset under a preset directory of the file system.

Figure 5:
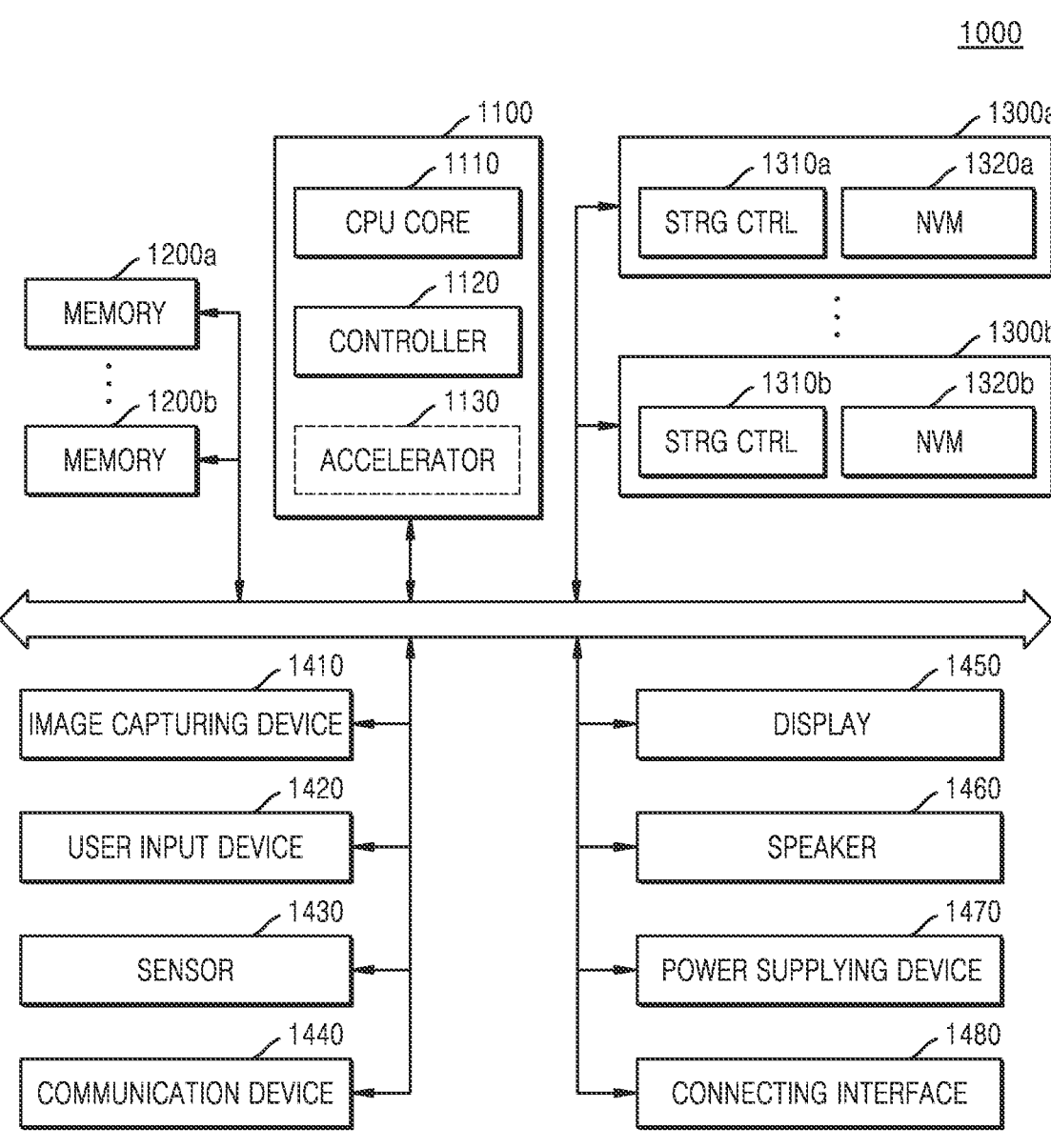
FIG. 5 is a schematic diagram of a system to which a storage device is applied according to some embodiments.

FIG. 5 is a schematic diagram of a system 1000 to which a storage device is applied according to some embodiments.

The system 1000 of FIG. 5 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 5 is not necessarily limited to the mobile system and may be a PC, a laptop computer, a server, a media player, or an automotive device (e.g., a navigation device).

Referring to FIG. 5, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, stage-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and Non-Volatile Memories (NVMs) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Those skilled in the art will appreciate that the storage devices (e.g., 1300a and 1300b) may support the Multistream storage mechanism.

As an example, in some embodiments, a system to which a storage device is applied may include a main processor (for example, CPU core 1100), a memory (for example, memories 1200a and 1200b); and storage devices (for example, storage devices 1300a and 1300b), wherein the memory stores a computer program for the main processor to perform the data storage method as described above.

Figure 6:
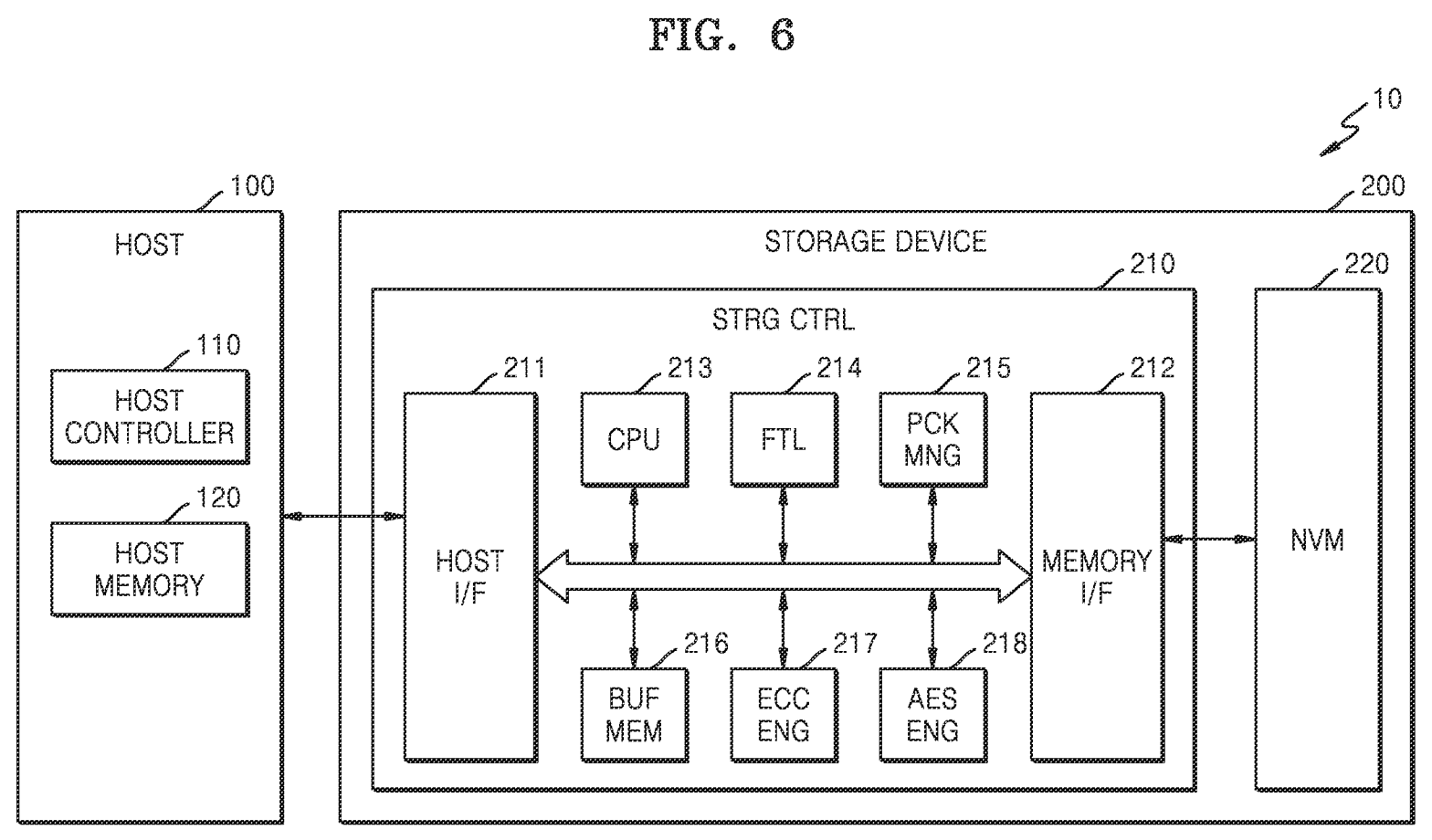

FIG. 6 is a block diagram of a host storage system 10 according to some embodiments.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to some embodiments, the host controller 110 and the host memory 120 may be implemented as separate semiconductor chips. In some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager (PCK MNG) 215, a buffer memory (BUF MEM) 216, an error correction code (ECC) engine (ENG) 217, and an advanced encryption standard (AES) engine (ENG) 218. The storage controllers 210 may further include a working memory (not shown) in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. The buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

According to some embodiments, a host storage system is provided, including a host (for example, host 100); and a storage device (for example, storage device 200) supporting the Multi-stream storage mechanism, wherein the host memory is configured to perform the data storage method as described above.

Figure 7:
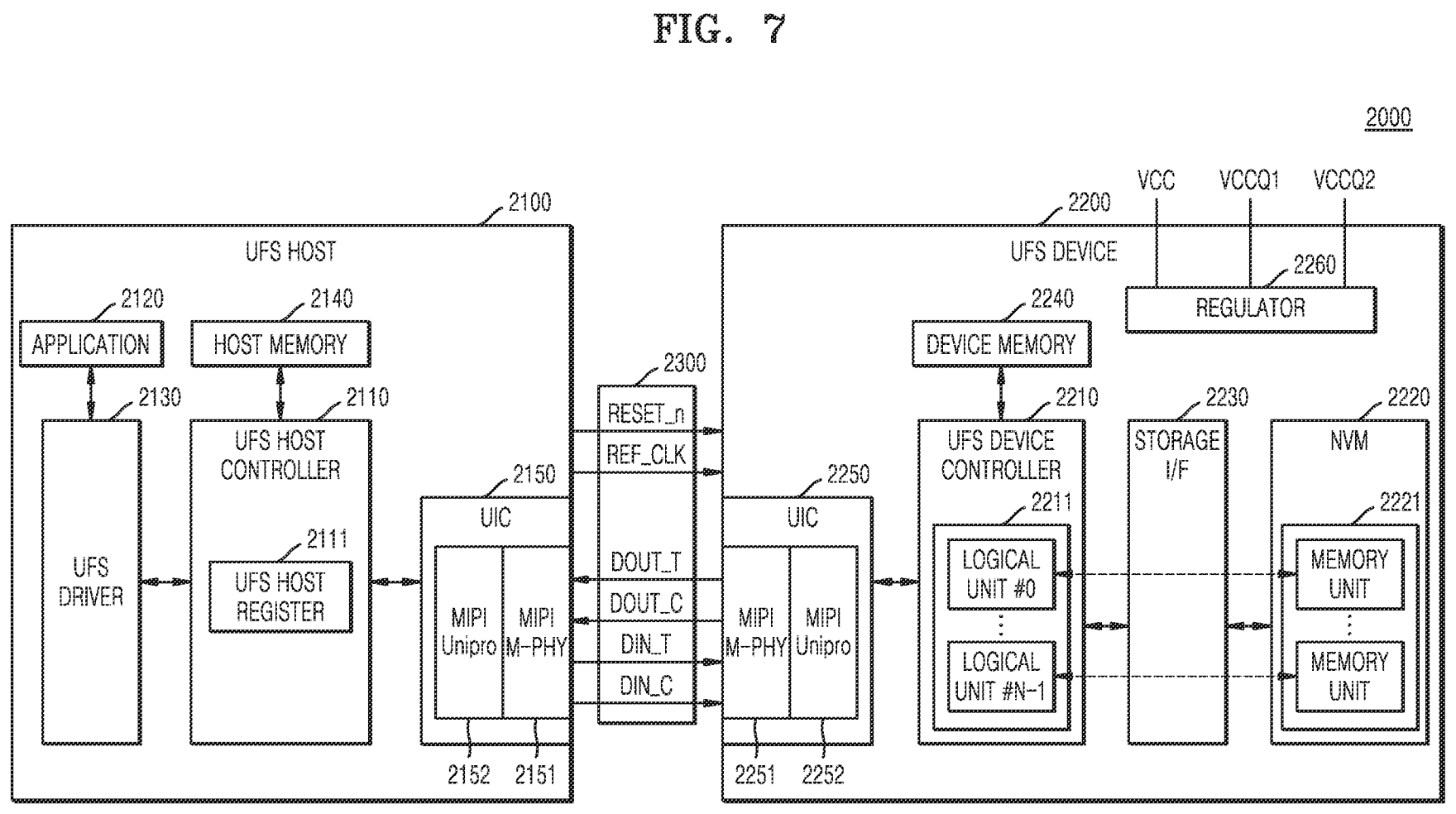

FIG. 7 is a block diagram of a UFS system 2000 according to some embodiments.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 5 may also be applied to the UFS system 2000 of FIG. 7 within a range that does not conflict with the following description of FIG. 7.

Referring to FIG. 7, the UFS host 2100 may be connected to the UFS device 2200 through the UFS interface 2300. When the main processor 1100 of FIG. 5 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 5. The UFS device 2200 may correspond to the storage device 1300a and 1300b of FIG. 5, and a UFS device controller 2210 and an NVM 2220 may respectively correspond to the storage controllers 1310a and 1310b and the NVMs 1320a and 1320b of FIG. 5.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI)

M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHZ, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 7, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 7, embodiments are not limited thereto and, in some embodiments, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 stores data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 read the data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In some embodiments, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

According to some embodiments, a UFS system may be provided including a UFS host (for example, UFS Host 2100); a UFS device (for example, UFS Device 2200); and a UFS interface (for example, UFS interface 2300), used for a communication between the UFS device and the UFS host, and the UFS host is configured to execute the data storage method as described above.

Figure 8:
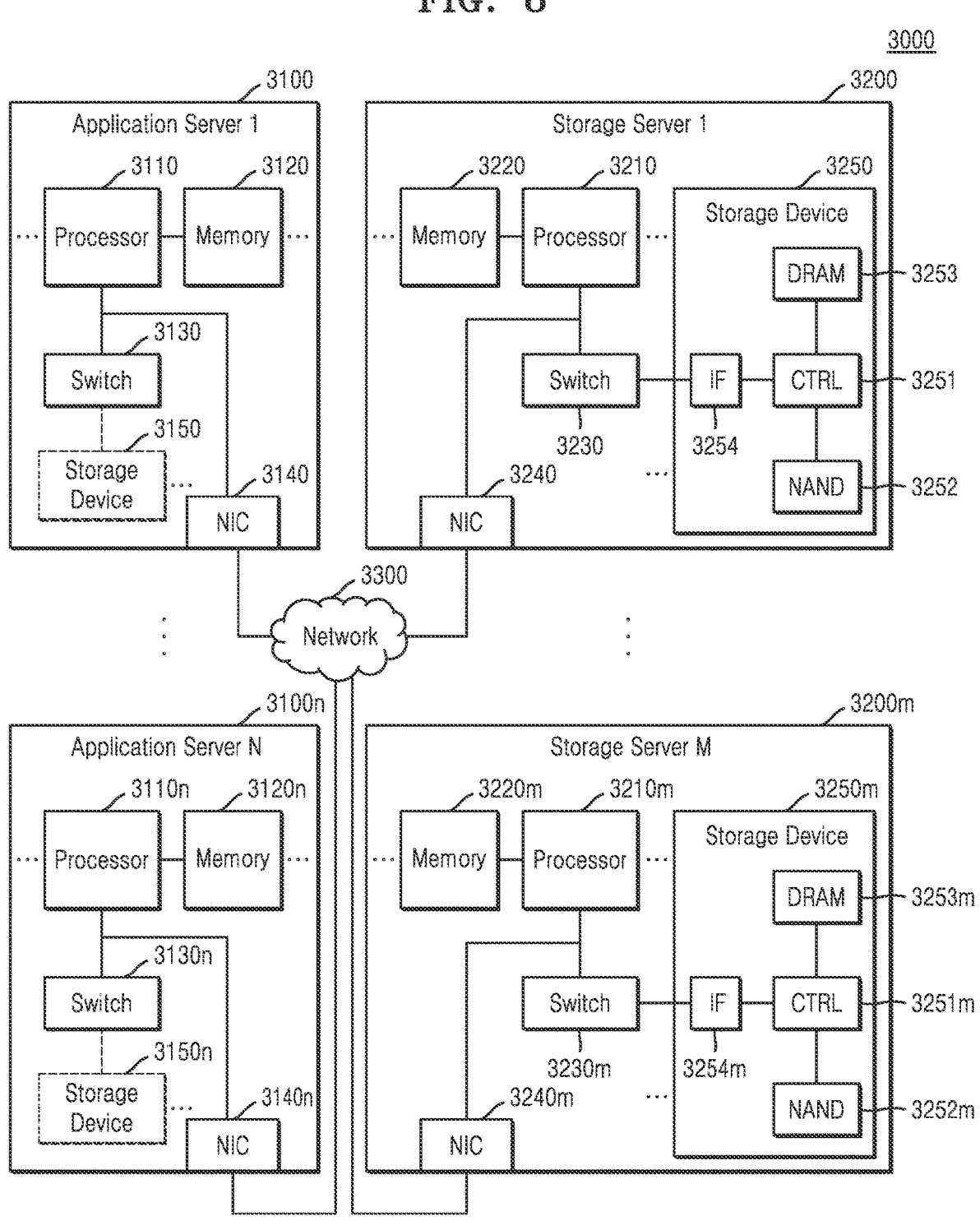
FIG. 8 is a diagram of a data center to which storage devices are applied, according to some embodiments.

FIG. 8 is a diagram of a data center 3000 to which a storage device is applied according to some embodiments. Platform portion-Server (Application/Storage)

Referring to FIG. 8, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.
Platform Portion-Network The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCOE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. In some embodiments, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.
Organic Relationship-Interface Structure/Type The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

Organic Relationship-Interface Operation

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

Product Portion-SSD Basic Operation

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

According to some embodiments, a data center system (for example, data center 3000) may be provided including a plurality of application servers (for example, application servers 3100-3100*n*); and a plurality of storage servers (for example, storage servers 3200-3200*m*), wherein each storage server includes a storage device supporting the Multi-stream storage mechanism, and at least one of the plurality of application servers and the plurality of storage servers is configured to perform the data storage method as described above. In other words, in some embodiments, an application server of the application servers 3100-3100*n* may be configured to perform the data storage method as described above. In some embodiments, a storage server of the storage servers 3200-3200*m* may be configured to perform the data storage method as described above.

According to some embodiments, there is provided a computer-readable storage medium storing a computer program which, when executed by a processor, causes the processor to execute the data storage method as described above.

According to some embodiments, there is provided an electronic apparatus including a processor; and a memory storing a computer program which, when executed by the processor, causes the processor to execute the data storage method as described above.

Figure 9:
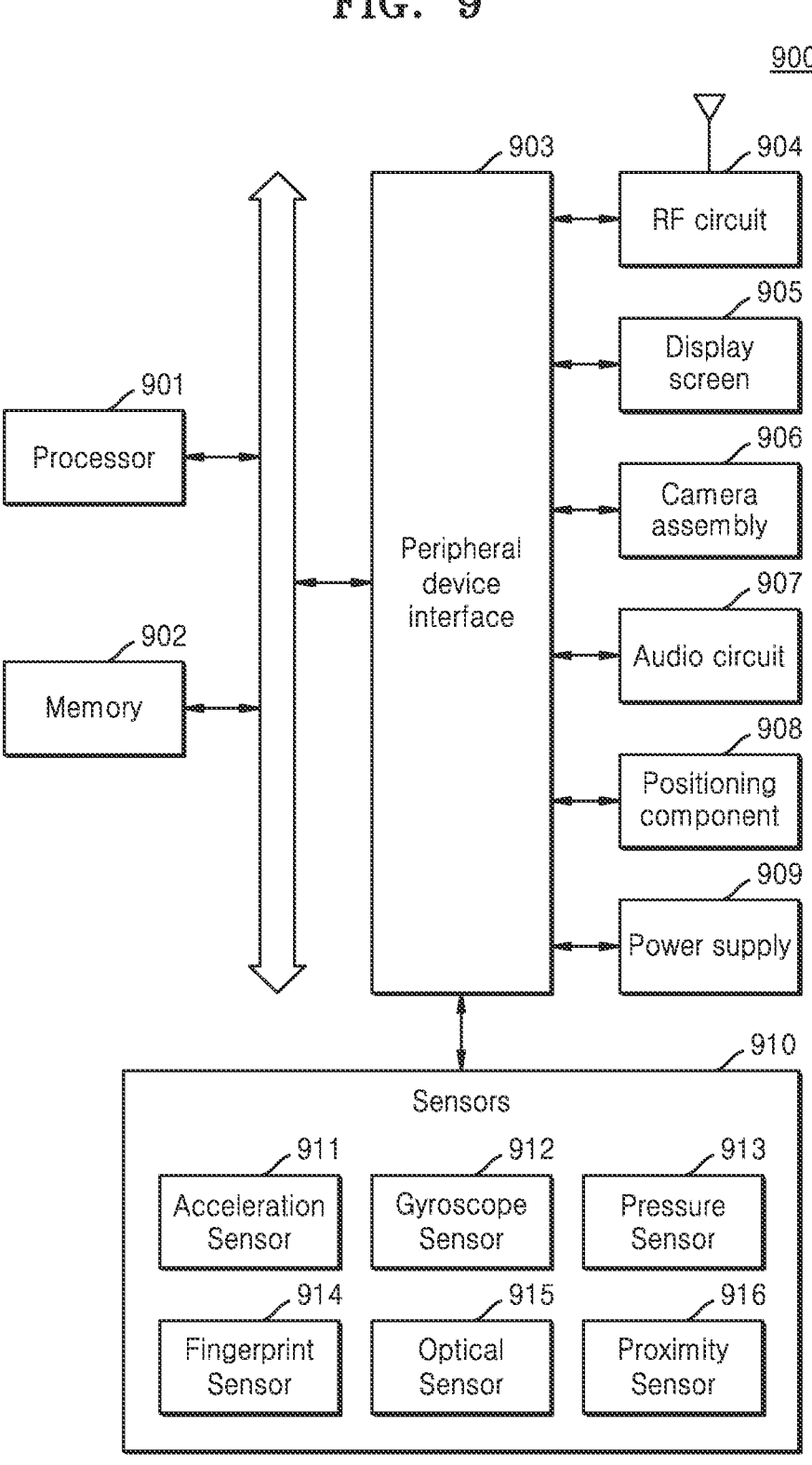
FIG. 9 is a block diagram illustrating a structure of a data storage device according to some embodiments.

FIG. 9 is a structural block diagram illustrating a data storage device 900 according to some embodiments. The data storage device 900 may be, for example, a smart phone, a tablet computer, an MP3 (Moving Picture Experts Group Audio Layer III) player, MP4 (Moving Picture Experts Group Audio Layer IV) Player, laptop or desktop computer. The data storage device 900 may also be called user equipment, portable terminal, laptop terminal, desktop terminal and other names.

The data storage device 900 includes a processor 901 and a memory 902.

The processor 901 may include one or more processing cores, such as a 4-cores processor, an 8-cores processor, and so on. The processor 1001 may be implemented in at least one hardware form of DSP (Digital Signal Processing), FPGA (Field Programmable Gate Array), PLA (Programmable Logic Array). The processor 901 may also include a main processor and a slave processor. The main processor is a processor used to process data in a awake state, also called a CPU (Central Processing Unit); the slave processor is a low-power processor used to process data in a standby state. In some embodiments, the processor 901 may be integrated with a GPU (Graphics Processing Unit) used to render and draw content that needs to be displayed on the display screen. In some embodiments, the processor 901 may further include an AI (Artificial Intelligence) processor used to process calculation operations related to machine learning.

The memory 902 may include one or more computer-readable storage media, which may be non-transitory. The memory 902 may also include a high-speed random access memory and a non-volatile memory, such as one or more magnetic disk storage devices and flash memory storage devices. In some embodiments, the non-transitory computer-readable storage medium in the memory 902 is used to store program code or at least one instruction used to be executed by the processor 901 to implement the data storage method described above.

In some embodiments, the data storage device 900 may further include a peripheral device interface 903 and at least one peripheral device. The processor 901, the memory 902, and the peripheral device interface 903 may be connected by a bus or a signal line. Each peripheral device may be connected to the peripheral device interface 903 through a bus, a signal line, or a circuit board. Specifically, the peripheral devices includes: a radio frequency (RF) circuit 904, a display screen 905, a camera assembly 906, an audio circuit 907, a positioning component 908, and a power supply 909.

The peripheral device interface 903 may be used to connect at least one peripheral device related to I/O (Input/Output) to the processor 901 and the memory 902. In some embodiments, the processor 901, the memory 902, and the peripheral device interface 903 are integrated on the same chip or circuit board; in some other embodiments, any one or two of the processor 901, the memory 902, and the peripheral device interface 903 may be implemented on a separate chip or circuit board.

The radio frequency circuit 904 is used for receiving and transmitting RF (Radio Frequency) signals, also called electromagnetic signals. The radio frequency circuit 904 communicates with a communication network and other communication devices through electromagnetic signals. The radio frequency circuit 904 converts electrical signals into electromagnetic signals for transmission, or converts received electromagnetic signals into electrical signals. In some embodiments, the radio frequency circuit 904 includes: an antenna system, an RF transceiver, one or more amplifiers, a tuner, an oscillator, a digital signal processor, a codec chipset, a user identity module card, and so on. The radio frequency circuit 904 can communicate with other terminals through at least one wireless communication protocol. The wireless communication protocol includes, but is not limited to: metropolitan area networks, various generations of mobile communication networks (2G, 3G, 4G, and 5G), wireless local area networks and/or Wi-Fi (Wireless Fidelity) networks. In some embodiments, the radio frequency circuit 904 may also include a circuit related to NFC (Near Field Communication), which is not limited in the present disclosure.

The display screen 905 is used to display a UI (User Interface). The UI may include graphics, text, icons, videos, and any combination thereof. When the display screen 905 is a touch display screen, the display screen 905 also has an ability to collect touch signals on or above the surface of the display screen 905. The touch signal may be input to the processor 901 as a control signal for processing. At this time, the display screen 905 may also be used to provide virtual buttons and/or virtual keyboards, also called soft buttons and/or soft keyboards. In some embodiments, the display screen 905 may be one display screen, which is arranged on the front panel of the failure prediction device 900; in other embodiments, the display screen 905 may be at least two display screens 905, which are respectively arranged on different surfaces of the terminal 1000 or in a folded design. In still other embodiments, the display screen 905 may be a flexible display screen, which is arranged on the curved surface or the folding surface of the failure prediction device 900. Furthermore, the display screen 905 may also be set as a non-rectangular irregular shape, that is, a special-shaped screen. The display screen 905 may be made of materials such as LCD (Liquid Crystal Display), OLED (Organic Light-Emitting Diode).

The camera assembly 906 is used to capture images or videos. In some embodiments, the camera assembly 906 includes a front camera and a rear camera. Generally, the front camera is set on the front panel of the terminal, and the rear camera is set on the back of the terminal. In some embodiments, the rear camera is at least two cameras, each of which is a main camera, a depth-of-field camera, a wide-angle camera, and a telephoto camera, so as to realize a fusion of the main camera and the depth-of-field camera to realize the background blur function, a fusion of the main camera and the wide-angle camera to realize panoramic shooting and VR (Virtual Reality) shooting function or other fusion shooting functions. In some embodiments, the camera assembly 906 may also include a flash. The flash may be a single-color temperature flash or a dual-color temperature flash. Dual color temperature flash refers to a combination of warm light flash and cold light flash, which may be used for light compensation under different color temperatures.

The audio circuit 907 may include a microphone and a speaker. The microphone is used to collect sound waves of the user and the environment, and convert the sound waves into electrical signals and input them to the processor 901 for processing, or input to the radio frequency circuit 904 to implement voice communication. For the purpose of stereo collection or noise reduction, there may be multiple microphones, which are respectively set in different parts of the failure prediction device 900. The microphone may also be an array microphone or an omnidirectional collection microphone. The speaker is used to convert the electrical signal from the processor 901 or the radio frequency circuit 904 into sound waves. The speaker may be a traditional thin-film speaker or a piezoelectric ceramic speaker. When the speaker is a piezoelectric ceramic speaker, it may not only convert electrical signals into sound waves that are audible to humans, but also convert electrical signals into sound waves that are inaudible to humans for distance measurement and other purposes. In some embodiments, the audio circuit 907 may also include a headphone jack.

The positioning component 908 is used to locate a current geographic location of the failure prediction device 900 to implement navigation or LBS (Location Based Service). The positioning component 908 may be a positioning component based on the GPS (Global Positioning System) of the United States, the Beidou system of China, the GLONASS system of Russia, or the Galileo system of the European Union.

The power supply 909 is used to supply power to various components in the data storage device 900. The power supply 909 may be alternating current, direct current, disposable batteries, or rechargeable batteries. When the power supply 909 includes a rechargeable battery, the rechargeable battery may support wired charging or wireless charging. The rechargeable battery may also be used to support fast charging technology.

In some embodiments, the data storage device 900 may further include one or more sensors 910. The one or more sensors 910 include, but are not limited to: an acceleration sensor 911, a gyroscope sensor 912, a pressure sensor 913, a fingerprint sensor 914, an optical sensor 915, and/or a proximity sensor 916.

The acceleration sensor 911 may detect the magnitude of acceleration on the three coordinate axes of the coordinate system established by the terminal 900. For example, the acceleration sensor 911 may be used to detect the components of gravitational acceleration on three coordinate axes. The processor 901 may control the touch screen 905 to display the user interface in a horizontal view or a vertical view according to the gravity acceleration signal collected by the acceleration sensor 911. The acceleration sensor 911 may also be used for the collection of game or user motion data.

The gyroscope sensor 912 may detect the body direction and rotation angle of the failure prediction device 900, and the gyroscope sensor 912 may cooperate with the acceleration sensor 911 to collect the user's 3D actions on the failure prediction device 900. The processor 901 may implement the following functions according to the data collected by the gyroscope sensor 912: motion sensing (for example, changing the UI according to the user's tilt operation), image stabilization during shooting, game control, and inertial navigation.

The pressure sensor 913 may be disposed on a side frame of the failure prediction device 900 and/or the lower layer of the touch screen 905. When the pressure sensor 913 is arranged on the side frame of the failure prediction device 900, the user's holding signal for the terminal 900 may be detected, and the processor 901 performs left and right hand recognition or quick operation according to the holding signal collected by the pressure sensor 913. When the pressure sensor 913 is arranged on the lower layer of the touch display screen 905, the processor 901 controls a operability control element on the UI according to the user's pressure operation on the touch display screen 905. The operability control element includes at least one of a button control element, a scroll bar control element, an icon control element, and a menu control element.

The fingerprint sensor 914 is used to collect a user's fingerprint, and the processor 901 identifies the user's identity according to the fingerprint collected by the fingerprint sensor 914, or the fingerprint sensor 914 identifies the user's identity according to the collected fingerprint. When it is recognized that the user's identity is a trusted identity, the processor 901 authorizes the user to perform related sensitive operations, including unlocking a screen, viewing encrypted information, downloading software, paying, and changing settings. The fingerprint sensor 914 may be provided on the front, back or side of the failure prediction device 900. When the data storage device 900 is provided with a physical button or a manufacturer logo, the fingerprint sensor 914 may be integrated with the physical button or the manufacturer logo.

The optical sensor 915 is used to collect the ambient light intensity. In an embodiment, the processor 901 may control the display brightness of the touch screen 905 according to the intensity of the ambient light collected by the optical sensor 915. Specifically, when the ambient light intensity is high, the display brightness of the touch display screen 905 is increased; when the ambient light intensity is low, the display brightness of the touch display screen 905 is decreased. In another embodiment, the processor 901 may also dynamically adjust the shooting parameters of the camera assembly 906 according to the ambient light intensity collected by the optical sensor 915.

The proximity sensor 916, also called a distance sensor, is usually arranged on a front panel of the data storage device 900. The proximity sensor 916 is used to collect a distance between the user and the front of the data storage device 900. In one embodiment, when the proximity sensor 916 detects that the distance between the user and the front of the failure prediction device 900 gradually decreases, the processor 901 controls the touch screen 905 to switch from on-screen state to off-screen state; when the proximity sensor 916 detects that the distance between the user and the front of the data storage device 900 gradually increases, the processor 901 controls the touch display screen 905 to switch from the off-screen state to the on-screen state.

Those skilled in the art may understand that the structure shown in FIG. 9 does not constitute a limitation on the data storage device 900, and in some embodiments, the data storage device 900 may include more or fewer components than shown, or combine certain components, or adopt different component arrangements.

According to some embodiments, there may also be provided a computer-readable storage medium storing a computer program which, when executed by at least one processor, causes the at least one processor to execute the data storage method according to the present disclosure. Examples of computer-readable storage media here include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors or computers.

Those skilled in the art will easily think of other embodiments of the present disclosure after considering the specification and practicing the disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The specification and the embodiments are to be regarded as exemplary only, and the actual scope and spirit of the present disclosure are pointed out by the following claims.

What is claimed is:

1. A data storage method comprising:
   clustering first access attribute information comprising at least one of creation information, open information, modification information, close information or deletion information of data files into first categories, the data files each having corresponding metadata;
   allocating first stream identifiers (IDs) of a first subset of a plurality of streams, of a storage device that supports multi-stream, to the data files, each of the data files whose first access attribute information have a same first category being allocated one of the first stream IDs of the first subset;
   clustering second access attribute information comprising at least one of sequentiality, frequency, or recency of the metadata into second categories;

allocating second stream IDs of a second subset of the plurality of streams to the metadata, each of the metadata whose second access attribute information have a same second category being allocated one of the second stream IDs of the second subset; and writing the data files that are allocated the first stream IDs of the first subset to a same first storage area of the storage device, and writing the metadata that are allocated the second stream IDs of the second subset into a same second storage area of the storage device.

2. The data storage method of claim 1, wherein the first stream IDs are embedded in the data files and the second stream IDs are embedded in the metadata.

3. The data storage method of claim 1, wherein clustering the first access attribute information comprises:

determining the first stream IDs based on a result of the clustering of the first access attribute information.

4. The data storage method of claim 3, wherein clustering the second access attribute information comprises:

determining the second stream IDs based on a result of the clustering of the second access attribute information.

5. The data storage method of claim 1, wherein clustering the second access attribute information comprises:

determining the second stream IDs based on a result of the clustering of the second access attribute information.

6. The data storage method of claim 1, further comprising:

storing the first access attribute information in a file attribute table; and storing the second access attribute information in a metadata access table.

7. The data storage method of claim 1, wherein the first subset does not intersect with the second subset.

8. A non-transitory computer-readable storage medium that stores a computer program which, when executed by a processor, causes the processor to at least:

cluster first access attribute information comprising at least one of creation information, open information, modification information, close information or deletion information of data files into first categories, the data files each having corresponding metadata;

cluster second access attribute information comprising at least one of sequentiality, frequency, or recency of the metadata into second categories;

allocate first stream identifiers (IDs) of a first subset of a plurality of streams, of a storage device that supports multi-stream, to the data files, each of the data files whose first access attribute information have a same first category being allocated one of the first stream IDs of the first subset;

allocate second stream IDs of a second subset of the plurality of streams to the metadata, each of the metadata whose second access attribute information have a same second category being allocated one of the second stream IDs of the second subset; and write the data files that are allocated the first stream IDs of the first subset to a same first storage area of the storage device, and write the metadata that are allocated the second stream IDs of the second subset into a same second storage area of the storage device.

9. The non-transitory computer-readable storage medium of claim 8, wherein the first subset does not intersect with the second subset.

10. A data storage device comprising at least one processor that is configured to at least:

cluster first access attribute information comprising at least one of creation information, open information, modification information, close information or deletion information of data files into first categories, the data files each having corresponding metadata;

cluster second access attribute information comprising at least one of sequentiality, frequency, or recency of the metadata into second categories;

allocate first stream identifiers (IDs) of a first subset of a plurality of streams, of a storage device that supports multi-stream, to the data files, each of the data files whose first access attribute information have a same first category being allocated one of the first stream IDs of the first subset, and allocate second stream IDs of a second subset of the plurality of streams to the metadata, each of the metadata whose second access attribute information have a same second category being allocated one of the second stream IDs of the second subset; and write the data files that are allocated the first stream IDs of the first subset to a same first storage area of the storage device, and write the metadata that are allocated the second stream IDs of the second subset into a same second storage area of the storage device.

11. The data storage device of claim 10, wherein the at least one processor is configured to:

determine the first stream IDs based on a result of the clustering of the first access attribute information.

12. The data storage device of claim 11, wherein the at least one processor is configured to:

determine the second stream IDs based on a result of the clustering of the second access attribute information.

13. The data storage device of claim 10, wherein the at least one processor is configured to:

determine the second stream IDs based on a result of the clustering of the second access attribute information.

14. The data storage device of claim 10, further comprising:

a storage configured to store the first access attribute information in a file attribute table, and to store the second access attribute information in a metadata access table.

15. The data storage device of claim 10, wherein the first subset does not intersect with the second subset.

16. The data storage device of claim 10, wherein the first stream IDs are embedded in the data files and the second stream IDs are embedded in the metadata, wherein the at least one processor is configured to extract the first stream IDs from the data files and write the data files into the same first storage area of the storage device based on the first stream IDs that are extracted, and wherein the at least one processor is configured to extract the second stream IDs from the metadata and write the metadata into the same second storage area of the storage device based on the second stream IDs that are extracted.

17. A data storage system comprising:

a host that is configured to perform the data storage method of claim 1; and the storage device.

18. The data storage system of claim 17, wherein the host is a Universal Flash Storage (UFS) host and the storage device is a UFS device, and wherein the data storage system further comprises a UFS interface configured to provide communication between the UFS host and the UFS device.

* * * * *